(12) United States Patent
Vepsäläinen et al.

(10) Patent No.: US 11,536,681 B2
(45) Date of Patent: Dec. 27, 2022

(54) SOLID STATE REFERENCE ELECTRODE (71) Applicant: COMMONWEALTH SCIENTIFIC AND INDUSTRIAL RESEARCH ORGANISATION, Australian Capital Territory (AU)

(72) Inventors: Mikko Vepsäläinen, Victoria (AU); Colin David Wood, Western Australia (AU); Miao Chen, Victoria (AU); Durga Prasad Acharya, Victoria (AU); David Simon Macedo, Victoria (AU)

(73) Assignee: COMMONWEALTH SCIENTIFIC AND INDUSTRIAL RESEARCH ORGANISATION, Australian Capital Territory (AU)

(*) Notice: Subject to any disclaimer, the term of this patent is extended or adjusted under 35 U.S.C. 154(b) by 575 days.

(21) Appl. No.: 16/610,134

(22) PCT Filed: May 4, 2018

(86) PCT No.: PCT/AU2018/050412
§ 371 (c)(1),
(2) Date: Jan. 31, 2020

(87) PCT Pub. No.: WO2018/201200
PCT Pub. Date: Nov. 8, 2018

(65) Prior Publication Data
US 2020/0088670 A1 Mar. 19, 2020

(30) Foreign Application Priority Data

May 4, 2017 (AU) ............................... 2017901642

(51) Int. Cl.
*G01N 27/30* (2006.01)
*G01N 27/403* (2006.01)

(52) U.S. Cl.
CPC ....... *G01N 27/301* (2013.01); *G01N 27/4035* (2013.01)

(58) Field of Classification Search
CPC .................................................. G01N 27/301
See application file for complete search history.

(56) References Cited

U.S. PATENT DOCUMENTS

| 4,507,194 A * | 3/1985 | Shimomura | ......... G01N 27/301 204/435 |
| 2006/0065527 A1* | 3/2006 | Samproni | ............ G01N 27/301 204/418 |
| 2008/0029391 A1* | 2/2008 | Mao | ...................... A61B 5/1473 204/403.01 |

FOREIGN PATENT DOCUMENTS

| CN | 101 236 170 B | 8/2012 | |
| EP | 0267892 A2 * | 5/1988 | ............. G01N 27/30 |

(Continued)

OTHER PUBLICATIONS

Sakai et al., "A Humidity Sensor Using Cross-linked Quarternized Polyvinylpyridine," J. Electrochem. Soc., vol. 136, No. 1, Jan. 1989, pp. 171-174 (Year: 1989).*

(Continued)

*Primary Examiner* — Alexander S Noguerola
(74) *Attorney, Agent, or Firm* — Ladas & Parry LLP (57) ABSTRACT

The invention provides a solid state reference electrode comprising a reference element embedded in an electrochemically active composite, the electrochemically active composite comprising a polymeric matrix loaded with a solid inorganic salt, wherein the polymeric matrix comprises a cross-linked vinyl polymer of a vinyl monomer containing a heteroatom.

20 Claims, 6 Drawing Sheets

(56) References Cited

FOREIGN PATENT DOCUMENTS

| JP | 2004004011 A | 1/2004 |
|----|--------------|--------|
| JP | 2009301833 A | 12/2009 |
| WO | 2006/032284 | 3/2006 |
| WO | 2017/020019 | 2/2017 |
| WO | 2017/020019 A1 | 2/2017 |
| WO | 2017/030934 | 2/2017 |

OTHER PUBLICATIONS

European Patent Office Search Report issued in Applicant's corresponding European application dated Apr. 28, 2021.
CN 101 236 170 B _ English Translation.
Muhammad Faheem Akhtar et al: "Effect of 4-6 ethylene glycol dimethacrylate on swelling and on metformin hydrochloride release behavior of chemically crosslinked pH-sensitive acrylic acid-polyvinyl alcohol hydrogel", Daru Journal of Pharmaceutical Sciences, Biomed Central Ltd, London, UK, vol. 23, No. 1, Aug. 19, 2015 (Aug. 19, 2015), p. 41, XP021230672, ISSN: 2008-2231, DOI: 10.1186/S40199-015-0123-8.
Office Action dated Mar. 2, 2022 in People's Republic of China, Patent Application No. 201880029473.0.
Office Action issued in Japanese application JP 2019-560198.
Office Action for corresponding Chinese application 201880029473.0 in Chinese language.
ISR for International Application PCT/AU2018/050412.
Written Opinion for International Application PCT/AU2018/050412.
Harper, C. et al., "Plastics Materials and Processes: A Concise Encyclopedia", Hoboken, (2003). ISBN 0-471-45603-9, p. 451 [A ] 9-11, 29 * p. 451 *.
Tomasz_Sokalski, et al., "Analytical Quality Solid-State Composite Reference Electrode and Electrochemical Platform", ECS Transactions, (2014), vol. 61, No. 15, pp. 1-10, XP055554139 [A] 1-40 * Abstract *.

* cited by examiner

SOLID STATE REFERENCE ELECTRODE

RELATED APPLICATION

This application is an application under 35 U.S.C. 371 of International Application No. PCT/AU2018/050412 filed on 4 May 2018, which claims priority of AU 2017901642 filed 4 May 2017 the entire contents of which are incorporated herein by reference.

TECHNICAL FIELD

The invention relates to solid state reference electrodes, and in particular to reference electrodes comprising a reference element embedded in an electrochemically active composite comprising a cross-linked vinyl polymer matrix loaded with an inorganic salt. The invention also relates to methods of producing the reference electrodes, to systems and methods for determining an ionic concentration in an analyte in which the reference electrodes are utilised in combination with an ion-sensing electrode, and to use of the reference electrode in an electrochemical analysis of an acidic analyte.

BACKGROUND OF INVENTION

Electroanalytical techniques, including potentiometric and voltametric electroanalytical measurements, rely on both an indicator electrode and a reference electrode, the performance of which are of equal importance for the accuracy of the measurement. For potentiometric measurements, the potential of the indicator electrode is measured against that of the reference cell. It is thus critical that the reference electrode provides a stable and reproducible potential which is substantially independent of the concentration of species in the analyte, including the target species for analysis.

To provide a constant reference potential, reference electrodes have traditionally included a reference element immersed in a reservoir of liquid or gel electrolyte of known salt concentration, contained within a casing. Silver/silver chloride (Ag/AgCl) and calomel ($Hg/Hg_2Cl_2$) reference elements in aqueous potassium chloride (KCl) electrolytes are common. Although the electrolyte is substantially isolated from the analyte by the casing, a liquid junction (salt bridge) between the analyte and the internal electrolyte is required to provide ionic communication, thereby completing the electrochemical cell. The liquid junction typically comprises a small opening or porous plug in the casing.

Although traditional reference electrodes are suitable for many applications, they also have significant disadvantages. These include leakage of the electrolyte through the liquid junction, potentially contaminating the analyte with the reference electrolyte salt, and infiltration of the analyte into the internal electrolyte, affecting the electrolyte salt concentration and introducing extraneous species that interfere with the reference half-cell reaction. Although the junction and electrolyte can be designed to mitigate these concerns, there is an inherent trade-off between the imperatives to minimise liquid communication between electrolyte and analyte and to maintain an acceptable junction potential, which is a source of error in the analytical measurement. Furthermore, traditional electrodes are difficult to miniaturise due to the electrolyte volume and complex construction, and are also generally positionally dependent, fragile, expense and maintenance-intensive.

A number of previous efforts have been made to address one or more of these challenges, using solid state reference electrodes lacking an internal electrolyte and a liquid-liquid junction. Vonau et al., DE 10305005, described a sintered Ag/AgCl reference element embedded in a solidified melt of KCl. The KCl was enclosed within a chemical resistant, ceramic layer, itself sealed in an insulating casing apart from a small opening. The porous ceramic layer at this opening formed a junction, which was required to modulate the ionic communication between the inner electrode and the analyte, and to limit KCl dissolution into the analyte. The solid state reference electrode was used successfully in combination with antimony pH indicator electrode. These electrodes remain reliant on a porous junction between the interior salt and the analyte, resulting in a fragile and complex construction.

Nolan et al., Analytical Chemistry 1997 (69) 1244, fabricated solid state reference electrodes by dip coating Ag/AgCl wires with a solution of NaCl and polyvinylchloride (PVC) to provide an immobilised electrolyte, and subsequently coating the wire with a protective overcoating of permeable polyurethane or Nafion to prevent leaching of the NaCl into an analyte. The electrodes suffered from significant drift due to the low loading of electrolyte, were susceptible to chloride leaching notwithstanding the presence of a protective polymer "casing" and were not satisfactorily stable for many electrochemical applications.

More generally, efforts to protect inner reference electrodes with permeable coatings or membranes may result in increased complexity of construction and the risk that damage, fouling or wear of the protective membrane causes error or failure of the device, for example by exposing the sensitive underlying reference electrode material directly to a corrosive analyte. Restoration of the device in such cases, if practical at all, can generally only be achieved by removing and re-applying the protective coating or membrane.

Vonau et al., DE19533059, reported reference electrodes comprising an Ag/AgCl reference element embedded in a hardened resin composite. The polyester resin, loaded with KCl, was hardened with peroxide hardeners to produce the cured electrode body. However, hardened resin composite electrodes may have high impedance due to poor ionic communication between the reference element and the analyte.

Mousavi et al., *Analyst* 2013 (138) 5216 and *Journal of Solid State Electrochemistry* 2014 (18) 607, prepared reference electrodes comprising an Ag/AgCl reference element embedded in a polyvinyl acetate (PVAc) homopolymer loaded with particulate KCl. The composite materials could be formed either by injection moulding of mixed PVAc/KCl powder or by chemical polymerisation of a suspension of particulate PVAc and KCl in vinyl acetate monomer. Good potential stability was exhibited in a range of different analytes. However, the resistance to chemical and mechanical degradation of these electrodes may be unsatisfactory, particularly in corrosive or abrasive environments.

Despite progress to date, previously reported solid state reference electrodes generally fail to provide a satisfactory balance of properties; in particular resistance to chemical and or mechanical degradation, rapid conditioning and low impedance. There is therefore an ongoing need to provide solid state reference electrodes which provide an improved balance of these properties, particularly in harsh use conditions, while preferably also providing one or more of a low rate of salt leakage into the analyte, long electrode lifetime, simplicity of construction and suitability for miniaturisation and a variety of electrode configurations.

A reference herein to a patent document or other matter which is given as prior art is not to be taken as an admission that the document or matter was known or that the information it contains was part of the common general knowledge as at the priority date of any of the claims.

SUMMARY OF INVENTION

The inventors have discovered that a solid state reference electrode, comprising an electrochemically active composite with a matrix comprising a cross-linked vinyl polymer of a vinyl monomer containing a heteroatom, exhibits excellent resistance to chemical and/or mechanical degradation, including in some embodiments in highly acidic use conditions. These reference electrodes may also provide one or more of rapid conditioning, low impedance and high electrochemical stability. Vinyl polymers cross-linked with hydrophilic cross-linking groups may provide a particularly favourable balance of properties, which is believed to be due to enhanced ionic conductivity between the reference electrode and the analyte while maintaining excellent resistance to degradation. Moreover, in some embodiments, it is believed that fouling or degradation of the reference electrode after a use period can be addressed by simply removing a surface layer of the composite to expose fresh composite beneath.

In accordance with a first aspect the invention provides a solid state reference electrode comprising a reference element embedded in an electrochemically active composite, the electrochemically active composite comprising a polymeric matrix loaded with a solid inorganic salt, wherein the polymeric matrix comprises a cross-linked vinyl polymer of a vinyl monomer containing a heteroatom.

In some embodiments, the cross-linked vinyl polymer is cross-linked with hydrophilic cross-linking groups.

In some embodiments, the cross-linked vinyl polymer is a co-polymer of the vinyl monomer and a cross-linking agent, wherein the cross-linking agent comprises at least two co-polymerisable vinyl functionalities. In some embodiments, the vinyl polymer comprises from 0.2 to 3.5 mol % of the cross-linking agent.

In some embodiments, the vinyl monomer is selected from the group consisting of vinyl esters, vinyl amides and acrylates. The vinyl polymer may comprise at least 50% by mass of the vinyl monomer containing a heteroatom.

In some embodiments, the composite is dimensionally stable in an aqueous analyte, such as an acidic analyte. The composite may be dimensionally stable in such analytes for periods of time longer than 1 week, preferably longer than one month.

In an embodiment, the invention provides a solid state reference electrode comprising a reference element selected from an Ag/AgCl, Ag/Ag$_2$SO$_4$ and Cu reference element, the reference element embedded in an electrochemically active composite comprising a polymeric matrix loaded with a solid inorganic salt selected from a chloride salt, a sulfate salt and copper sulfate, wherein the polymeric matrix comprises a cross-linked vinyl polymer which is a co-polymer of a hydrophilic cross-linking agent and a vinyl monomer selected from a vinyl ester, a vinyl amide and an acrylate.

In another embodiment, the invention provides a solid state reference electrode comprising an Ag/AgCl reference element embedded in an electrochemically active composite, the electrochemically active composite comprising a polymeric matrix loaded with a solid inorganic chloride salt, wherein the polymeric matrix comprises a cross-linked vinyl polymer which is a co-polymer of vinyl acetate and/or vinyl caprolactam and a cross-linking agent selected from the group consisting of ethylene glycol di(meth)acrylate, poly(ethylene glycol) di(meth)acrylate, and glycerol propoxylate triacrylate.

In accordance with a second aspect, the invention provides a method of producing a solid state reference electrode, the method comprising: dispersing a solid inorganic salt in a vinyl monomer containing a heteroatom and/or a polymer thereof; producing a cross-linked vinyl polymer by co-polymerising the vinyl monomer and a cross-linking agent or by cross-linking the polymer with a cross-linking agent, thereby forming an electrochemically active composite comprising a polymeric matrix loaded with the solid inorganic salt; and embedding a reference element in the electrochemically active composite.

In some embodiments, the cross-linked vinyl polymer is cross-linked with hydrophilic cross-linking groups.

In some embodiments, the solid inorganic salt is dispersed in a mixture comprising the vinyl monomer and a cross-linking agent, wherein the cross-linking agent comprises at least two co-polymerisable vinyl functionalities and wherein the cross-linked vinyl polymer is produced by co-polymerising the vinyl monomer and the cross-linking agent. The cross-linking agent may be a hydrophilic cross-linking agent.

In some embodiments, the vinyl monomer is selected from the group consisting of vinyl esters, vinyl amides and acrylates.

In an embodiment, the invention provides a method of producing a solid slate reference electrode, the method comprising: dispersing a solid inorganic salt selected from a chloride salt, a sulfate salt and copper sulfate in a mixture comprising a hydrophilic cross-linking agent and a vinyl monomer selected from a vinyl ester, a vinyl amide and an acrylate; co-polymerising the hydrophilic cross-linking agent and the vinyl monomer to produce a cross-linked vinyl polymer, thereby forming an electrochemically active composite comprising a polymeric matrix loaded with the solid inorganic salt; and embedding a reference element selected from an Ag/AgCl, Ag/Ag$_2$SO$_4$ and Cu reference element in the electrochemically active composite.

In an embodiment, the invention provides a method of producing a solid state reference electrode, the method comprising: dispersing a solid inorganic chloride salt in a mixture comprising vinyl acetate and/or vinyl caprolactam and a cross-linking agent selected from the group consisting of ethylene glycol di(meth)acrylate, poly(ethylene glycol) di(meth)acrylate, and glycerol propoxylate triacrylate; co-polymerising the cross-linking agent and the vinyl acetate and/or vinyl caprolactam to produce a cross-linked vinyl polymer, thereby forming an electrochemically active composite comprising a polymeric matrix loaded with the solid inorganic chloride salt; and embedding an Ag/AgCl reference element in the electrochemically active composite.

In accordance with a third aspect, the invention provides a solid state reference electrode produced by a method according to any of the embodiments disclosed herein.

In accordance with a fourth aspect, the invention provides a system for determining an ionic concentration in an acidic and/or abrasive analyte, the system comprising: a solid state reference electrode according to any of the embodiments disclosed herein; an ion-selective electrode; and means for measuring the difference in electric potential between the ion-selective electrode and the reference electrode.

In accordance with a fifth aspect, the invention provides a method of determining an ionic concentration in an acidic and/or abrasive analyte, the method comprising: immersing an ion-selective electrode and a solid state reference electrode according to any of the embodiments disclosed herein in an analyte; and measuring the difference in electrochemical potential between the ion-selective electrode and the reference electrode.

In accordance with a sixth aspect, the invention provides use of a solid state reference electrode according to any of the embodiments disclosed herein in an electrochemical analysis of an acidic analyte.

Where the terms "comprise", "comprises" and "comprising" are used in the specification (including the claims) they are to be interpreted as specifying the stated features, integers, steps or components, but not precluding the presence of one or more other features, integers, steps or components, or group thereof.

Further aspects of the invention appear below in the detailed description of the invention.

BRIEF DESCRIPTION OF DRAWINGS

Embodiments of the invention will herein be illustrated by way of example only with reference to the accompanying drawings in which.

DETAILED DESCRIPTION

Solid State Reference Electrode

The present invention relates to a solid state reference electrode. The solid state reference electrode comprises a reference element embedded in an electrochemically active composite. The electrochemically active composite comprises a polymeric matrix loaded with a solid inorganic salt. The polymeric matrix comprises a cross-linked vinyl polymer of a vinyl monomer containing a heteroatom.

Reference Element

The reference element may be any suitable reference element, including silver-silver chloride (Ag/AgCl), calomel ($Hg/Hg_2Cl_2$), silver-silver sulfate ($Ag/Ag_2SO_4$), mercury-mercury sulfate ($Hg/Hg_2SO_4$), and copper (for a $Cu/CuSO_4$ electrode system). Preferably, the reference element is an Ag/AgCl, an $Ag/Ag_2SO_4$ or a copper (Cu) reference element. These electrode systems are preferred at least in part for environmental and safety reasons. Ag/AgCl reference elements are particularly preferred.

The Ag/AgCl reference element may comprise a silver wire or other silver metallic body which is coated with silver chloride, typically electrochemically or by chemical oxidation. In some embodiments, the reference element may comprise a meshed or braided metallic structure to improve the surface area in contact with the electrochemically active composite. Ag/AgCl reference elements may also be fabricated by a variety of other methods, including by sintering a mixture of Ag and AgCl powders.

In use, the reference element is electrically connected to a sensing electrode via an external circuit. The reference element is thus typically provided with a suitable electrical termination for connection to a circuit. For example, in the case of a silver wire reference electrode, the electrical termination may be an uncoated end of the wire.

Electrochemically Active Composite

The reference element is embedded in, and thus in direct contact and electrochemical communication with, an electrochemically active composite which comprises a polymeric matrix loaded with a solid inorganic salt. The composite is generally a solid material which lacks an internal electrolyte reservoir. However, it is necessary that the composite is sufficiently permeable to provide satisfactory ionic conductivity between the reference element and the analyte, while nevertheless minimising the leakage of the inorganic salt into the analyte. Furthermore, the composite should preferably be resistant to degradation in harsh use environments such as strongly acidic analytes.

The electrochemically active composite is typically dimensionally stable in an aqueous analyte for the required lifetime of the device, which is may be more than one week, or more than one month. Dimensional stability is an important mechanical requirement for many applications. Thus, the composite preferably does not appreciably swell when immersed in an aqueous analyte, including acidic analytes, as this would lead to leaching of the solid inorganic salt. In some embodiments, however, it is believed that some degree of swelling, such as to less than 10% of the initial volume, may be tolerated.

The dimensionally stable composite may define the physical body of the solid state reference electrode. However, in some embodiments, the reference electrode comprises a casing around the electrochemically active composite. The casing may be made of a suitably insulating and durable material for the envisaged application, for example poly (methyl methacrylate).

A surface of the electrochemically active composite is generally at least partially exposed for direct contact with an analyte. A porous or permeable junction to separate the composite from the analyte is not required, and in some embodiments is therefore absent. The casing, if present, may therefore comprise a window to expose the surface of the composite to the analyte. The surface area directly exposed to the analyte may be selected to optimise the performance of the reference electrode for a particular application, for example to provide a desired lifetime. This may be done, for example, by selecting an appropriate size of the window in a casing, or by configuring the composite with an appropriate surface to volume ratio. A smaller exposed surface may reduce the rate of leakage of inorganic salt into the analyte. However, reducing the surface area exposed to the analyte may unduly limit the useful lifetime of the electrode, as an unacceptable junction potential may develop more rapidly at the composite-analyte interface due to fouling. The skilled person, with the benefit of this disclosure, will be able to select an appropriate physical shape and surface exposure of the electrochemically active composite for a particular application without undue burden.

The reference element embedded in the electrochemically active composite should be a suitable distance from the surface exposed to the analyte, such that electrochemical communication is provided. This depth may depend on the configuration of the electrode, the required lifetime of the device and the nature of the polymeric matrix. In some embodiments, the reference element is between 1 mm and 10 mm from the surface.

The electrochemically active composite is loaded with a solid inorganic salt. The solid inorganic salt is generally dispersed in the polymeric matrix, typically as a particulate solid. Although the solid inorganic salt is typically dispersed throughout the polymeric matrix, it is not excluded that a non-homogeneous distribution of inorganic salt is present in the composite. In some embodiments, the distribution of the inorganic salt results from the gravimetric settling of the particulate salt in the monomer mixture prior to polymerisation. In other embodiments, the electrochemically active composite may be produced in multiple layers, for example where the electrode is fabricated on a substrate. Gradients of inorganic salt density may thereby be produced; for example, it may be preferred that a layer directly adhered to the substrate may have a low concentration of salt.

A high loading of solid inorganic salt may be beneficial, as it may prolong the lifetime of the reference electrode. In some embodiments, the electrochemically active composite comprises at least 10% by mass of the solid inorganic salt, preferably at least 30% by mass, more preferably at least 50% by mass. However, the loading should not be so high that the physical integrity of the composite is compromised. A suitable loading may be achieved by allowing the inorganic salt, in the form of a particulate solid (i.e. a powder) to gravimetrically settle in the monomer mixture prior to polymerisation.

Solid Inorganic Salt

The solid inorganic salt comprises an ion required to participate in the redox half-reaction at the reference element. For example, Ag/AgCl and Cu/CuSO$_4$ reference electrodes require chloride salts and copper(II) salts respectively, in accordance with the half-cell potential for Ag/AgCl and Cu/CuSO$_4$ reference electrodes given by the Nernst equations (1) and (2) for these systems:

$$E = E^0 - \frac{RT}{F}\ln a_{Cl^-} \qquad (1)$$

$$E = E^0 - \frac{RT}{2F}\ln a_{Cu^{2+}} \qquad (2)$$

In some embodiments, the solid inorganic salt is a sulfate salt, for example copper sulfate for a Cu/CuSO$_4$ reference electrode, and potassium sulfate for an Ag/Ag$_2$SO$_4$ reference electrode. In other embodiments, the solid inorganic salt is a chloride salt, for example potassium chloride (KCl), sodium chloride (NaCl), or lithium chloride (LiCl), preferably KCl. Chloride salts are required where the reference electrode is, for example, an Ag/AgCl or calomel electrode.

In some embodiments, the inorganic salt consists of inorganic cations and inorganic anions, i.e. it lacks coordinating ligands or any other organic components. The inorganic salt is typically not covalently bonded to the polymeric matrix of the composite.

The inorganic salt is typically a particulate solid with an average particle size of less than 1 mm, preferably less than 500 microns. The particles should generally be small enough to form a well-dispersed, distribution throughout the polymeric matrix.

Cross-Linked Vinyl Polymer

The polymeric matrix of the electrochemically active composite comprises a cross-linked vinyl polymer. As used herein, a vinyl polymer is an addition polymer of one or more vinyl monomers, comprising an extended alkane ( . . . —C—C—C—C—C— . . . ) backbone chain.

The vinyl polymer is a polymer of at least one vinyl monomer containing a heteroatom. In some embodiments, the vinyl polymer includes vinyl monomers containing a heteroatom as the only mono-functional monomers. However, it is not excluded that the vinyl polymer may be a co-polymer of vinyl monomers containing a heteroatom, and other vinyl monomers lacking a heteroatom. In such cases, the vinyl polymer preferably comprises at least 50% by mass, more preferably at least 80% by mass, most preferably at least 90% by mass of the vinyl monomer containing a heteroatom.

The cross-linked vinyl polymer may be prepared by any suitable means, including those described in greater detail hereafter. In some embodiments, the vinyl monomer containing a heteroatom is polymerised to form an uncross-linked polymer, and cross-linking groups are subsequently formed between the polymer backbone chains with a suitable cross-linking agent. In other embodiments, a mixture of the vinyl monomer containing a heteroatom and a co-polymerisable cross-linking agent is polymerised to form the cross-linked vinyl polymer.

The cross-linking of the vinyl polymer may in some embodiments enhance the resistance of the electrode to degradation as a result of chemical attack, for example under strongly acidic and/or high temperature use conditions. In some embodiments, the cross-linking may enhance the resistance of the electrode to mechanical degradation, for example under abrasive use conditions. Electrodes comprising a cross-linked vinyl polymer according to the invention may therefore demonstrate an enhanced durability relative to a comparative electrode of similar composition, but in which the vinyl polymer lacks cross-linking groups.

Furthermore, the cross-linked polymer should have a suitable hydrophobic-hydrophilic balance. Without wishing to be bound by any theory, it is believed that the electrochemically active composite of the invention may advantageously provide sufficient water-permeability to provide ionic conductivity through the polymeric matrix between the reference element and the analyte. This ensures that the impedance of the electrode is acceptably low and that the electrode can rapidly achieve stable potential (i.e. is rapidly conditioned) when placed in an analyte. However, it is believed that the electrochemically active composite should not be too water-permeable, as this may result in substantial swelling of the polymer, loss of physical integrity of the electrode body and/or rapid leaching of the inorganic salt into the analyte. Achieving an optimum hydrophobic-hydrophilic balance for low impedance and high electrochemical stability, while also providing excellent chemical resistance and mechanical stability, may require an appropriate combination of the vinyl monomer(s), cross-linking groups and degree of cross-linking in the vinyl polymers, as will be further described hereafter.

Vinyl Monomer

The vinyl polymer is a polymer of a vinyl monomer containing a heteroatom. The vinyl monomer may optionally contain more than one heteroatom. The heteroatom or heteroatoms are preferably selected from oxygen and nitrogen. Without wishing to be bound by any theory, it is believed that a vinyl polymer with a sufficiently hydrophilic backbone chain is required to achieve acceptable ionic conductivity through the electrochemically active composite. Vinyl monomers containing at least one heteroatom are believed to be suitable for providing such a hydrophilic backbone chain. However, it will be appreciated that the vinyl monomer containing at least one heteroatom should be selected to provide a suitable hydrophilic-hydrophobic balance to the polymer matrix as a whole, having regard to other relevant considerations such as the contribution of the cross-linking groups and any other vinyl monomers. Thus, certain highly polar vinyl monomers may render the composite too hydrophilic when used as the most abundant vinyl monomer in the polymeric matrix. This may result, for example, in undesirable swelling of the electrode in aqueous analytes.

In some embodiments, the vinyl monomer containing a heteroatom is selected from the group consisting of vinyl esters, vinyl amides, acrylates, acrylonitrile and vinyl ethers. In some embodiments, the vinyl monomer comprises a carbonyl group, and may be selected from the group consisting of vinyl esters, vinyl amides and acrylates. Suitable vinyl monomers may include vinyl acetate, vinyl caprolactam, methyl (meth)acrylate, ethyl (meth)acrylate, butyl (meth)acrylate and hexyl (meth)acrylate, for example vinyl acetate and/or vinyl caprolactam.

In some embodiments, the vinyl polymer is a co-polymer of the vinyl monomer containing a heteroatom and a further vinyl monomer included to modify the hydrophilicity of the polymer backbone chain. For example, strongly polar vinyl monomers, such as 2-acrylamido-2-methylpropane sulfonic acid, may be included as a secondary co-monomer to increase the hydrophilicity of the vinyl polymer. This may be useful to achieve a satisfactory hydrophilic-hydrophobic balance of the polymer matrix when a relatively hydrophobic cross-linking agent is used.

Cross-Linking

The vinyl polymer is cross-linked with cross-linking groups, which are the residues in the cross-linked polymer of the cross-linking agent used to cross-link the polymer. In some embodiments, the vinyl polymer is cross-linked with hydrophilic cross-linking groups. As used herein, hydrophilic cross-linking groups are groups which impart hydrophilic properties to the polymer matrix. The matrix is thus more hydrophilic than a matrix comprising a linear (uncross-linked) polymer of the same monomers. Without wishing to be bound by any theory, it is believed that hydrophilic cross-linking groups may enhance the ionic conductivity of the electrochemically active composite, relative to a composite comprising a vinyl polymer cross-linked with hydrophobic cross-linking groups or without cross-linking groups, while still providing excellent chemical resistance and mechanical properties. The enhanced hydrophilic-hydrophobic balance of a vinyl polymer with hydrophilic cross-linking groups may, for example, result in an electrode which rapidly achieves stable operation and which has acceptably low impedance.

Hydrophilic cross-linking groups are generally organic linking groups which contain one or more hydrophilic functionalities. In some embodiments, the hydrophilic groups contain at least two hydrophilic functionalities. Suitable hydrophilic functionalities may include carboxyl, ether, amide and amine groups, preferably carboxyl and/or ether groups.

Although, hydrophilic cross-linking groups are preferred in some embodiments, it is not excluded that the vinyl polymer may instead be cross-linked with more hydrophobic cross-linking groups. It is believed that a suitable hydrophilic-hydrophobic balance may also be achieved in the vinyl polymer matrix by, for example, controlling the degree of cross-linking and/or by enhancing the hydrophilicity of the polymeric backbone chain with suitably polar vinyl monomer, despite the presence of hydrophobic cross-linking groups.

In some embodiments, the cross-linked vinyl polymer is a polymer of a vinyl monomer containing a heteroatom, which is cross-linked after the polymerisation step. The vinyl monomer may be polymerised to form an uncross-linked polymer, and cross-linking groups are subsequently formed between the polymer backbone chains with a suitable cross-linking agent. Similarly, a suitable uncross-linked vinyl polymer may be obtained from a commercial source and cross-linked with the cross-linking agent.

In embodiments where the vinyl polymer is a polymer of vinyl acetate, it is envisaged that cross-linking may be achieved by cross-linking of partially hydrolysed polyvinyl acetate having vinyl alcohol residues in the polymer backbone chain. Partially hydrolysed polyvinyl acetate may be cross-linked with cross-linking agents conventionally used to cross-link polyvinyl alcohol, such as glutaraldehyde, glyoxal, formaldehyde, glycidyl acrylate or divinyl sulfone.

In other embodiments, the cross-linked vinyl polymer is a co-polymer of a vinyl monomer comprising a heteroatom and a cross-linking agent. In such embodiments, the cross-linking agent comprises at least two co-polymerisable vinyl functionalities.

Co-Polymerisable Cross-Linking Agent

The cross-linking agent may comprise two or three co-polymerisable vinyl functionalities; however it is not excluded that the cross-linking agent may comprise four or even more co-polymerisable vinyl functionalities. In some embodiments, the co-polymerisable vinyl functionalities are selected from acrylates and methacrylates.

The cross-linking agent may be a hydrophilic cross-linking agent. As used herein, a hydrophilic cross-linking agent is a cross-linking agent which imparts hydrophilic properties to a polymer matrix into which it is polymerised. A hydrophilic cross-linking agent thus provides hydrophilic cross-linking groups when co-polymerised with vinyl monomers according to the invention. The cross-linking agent may be sufficiently hydrophilic such that the electrochemically active composite is more permeable to an aqueous analyte than a composite having a matrix comprising a linear (uncross-linked) polymer of the same monomers. Accordingly, electrochemical communication may be established, or established more rapidly, between the reference element and the analyte.

In other embodiments, the cross-linking agent may have hydrophobic character, such as the aliphatic cross-linker 1,6-hexanediol di(meth)acrylate. In such embodiments, the vinyl polymer may comprise at least one vinyl monomer of sufficiently high polarity to impart suitable hydrophilic properties to the polymer matrix. As a result, the electrochemical composite is sufficiently permeable to an aqueous analyte to permit electrochemical communication between the reference element and the analyte. An example of such a vinyl monomer is vinyl caprolactam.

In some embodiments, the cross-linking agent is selected from the group consisting of ethylene glycol di(meth)acrylate, diethylene glycol di(meth)acrylate, triethylene glycol di(meth)acrylate, tetraethylene glycol di(meth)acrylate, poly(ethylene glycol) dimethacrylate (for example, Mn=330-20,000), poly(ethylene glycol) diacrylate (for example, Mn=250-20,000), N,N'-methylene bis-acrylamide, 1,3-butanediol di(meth)acrylate, 1,4-butanediol di(meth)acrylate, 1,6-hexanediol di(meth)acrylate, bisphenol A glycerolate di(meth)acrylate, diurethane di(meth)acrylate, divinylbenzene, trimethylolpropane tri(meth)acrylate, pentaerythritol tri(meth)acrylate, glycerol propoxylate triacrylate (for example, Mn=428), trimethylolpropane ethoxylate triacrylate and trimethylolpropane propoxylate triacrylate. As used herein, a "(meth)acrylate" refers to either an acrylate or a methacrylate.

In some embodiments, the cross-linking agent has the formula $CH_2=C(R^1)-C(=O)-(O-CH(R^2)-CH_2)_n-O-C(=O)-C(R^1)=CH_2$ or $X-[(O-CH(R^2)-CH_2)_n-O-C(=O)-C(R^1)=CH_2]_m$, wherein each $R^1$ and $R^2$ is independently selected from —H and —$CH_3$, wherein each n is an integer from 1 to 50, preferably from 1 to 15, such as from 1 to 4, wherein in is an integer from 2 to 6, preferably from 2 to 4, such as 3, and wherein X is an organic radical linking group having a valency equal to the value of m. In some embodiments, the cross-linking agent has the formula $CH_2=C(R^1)-C(=O)-(O-CH-CH_2)_n-O-C(=O)-C(R^1)=CH_2$, wherein each $R^1$ is independently selected from —H and —$CH_3$, wherein n is an integer from 1 to 50, preferably from 1 to 10, most preferably from 1 to 4. Co-polymerisation of these cross-linking agents will result in the formation of long-chain hydrophilic glycol-based cross-linking groups in the vinyl polymer.

In some embodiments, the cross-linking agent is selected from the group consisting of ethylene glycol di(meth)acrylate, poly(ethylene glycol) di(meth)acrylate, and glycerol propoxylate triacrylate. In some embodiments, the cross-linking agent is selected from the group consisting of ethylene glycol dimethacrylate and ethylene glycol diacrylate.

Cross-Linking Density

The vinyl polymer contains a suitable cross-linking density. If the cross-linking density is too low, the resistance to chemical and or mechanical degradation or the long term stability of the reference electrode may be compromised. However, if the cross-linking density is too high, the permeability or mechanical properties of the polymer may be unsatisfactory, even if the vinyl polymer comprises hydrophilic cross-linking groups. In embodiments where the vinyl polymer is a co-polymer of a vinyl monomer containing a heteroatom and a cross-linking agent, the vinyl polymer may comprise from 0.5 to 7% by mass of the cross-linking agent, preferably from 1 to 4% by mass of the cross-linking agent, most preferably from 1.5 to 3.5% by mass of the cross-linking agent.

In some embodiments, the vinyl polymer comprises from 0.2 to 3.5 mol % of the cross-linking agent (defined as the mol % cross-linking agent of the total monomers in the cross-linked polymer). In some embodiments, the vinyl polymer comprises from 0.2 to 2 mol % of the cross-linking agent.

Method of Producing a Solid State Reference Electrode

The present invention also relates to a method of producing a solid state reference electrode. The method comprises dispersing a solid inorganic salt in a vinyl monomer containing a heteroatom and/or a polymer thereof. A cross-linked vinyl polymer is then produced by co-polymerising the vinyl monomer and a cross-linking agent, or by cross-linking the polymer with a cross-linking agent. This forms an electrochemically active composite comprising a polymeric matrix loaded with the solid inorganic salt. A reference element is embedded in the electrochemically active composite.

The solid inorganic salt, vinyl monomer containing a heteroatom, cross-linking agent and reference element used in the method of the invention are as described herein in relation to embodiments of the solid state reference electrodes. In some embodiments, a hydrophilic cross-linking agent is selected to provide hydrophilic cross-linking groups in the cross-linked vinyl polymer.

In some embodiments, the method comprises polymerising vinyl monomers, including at least the vinyl monomer containing a heteroatom, to produce an uncross-linked polymer. The polymerisation may take place in the present of the solid inorganic salt, for example by dispersing the solid inorganic salt in the liquid vinyl monomers, and subsequently polymerising the vinyl monomers in the mixture. Alternatively, an uncross-linked polymer, comprising at least the vinyl monomer containing a heteroatom, may be prepared or obtained, and then combined with the solid inorganic salt. The uncross-linked polymer may be in the form of a melt, a solution or a particulate solid when combined with the solid inorganic salt.

In such embodiments, the uncross-linked polymer containing the dispersed solid inorganic salt is then cross-linked to form the electrochemically active composite comprising a polymeric matrix loaded with the solid inorganic salt. Cross-linking may be achieved by any suitable means. In embodiments where the vinyl polymer comprises vinyl acetate, the method may further comprise a step of partially hydrolysing the uncross-linked polyvinyl acetate to produce a suitable amount of vinyl alcohol residues in the polymer backbone chain. The polyvinyl acetate may be partially hydrolysed using conventional approaches, including by base-catalysed transesterification of the polymer with ethanol. The partially hydrolysed polyvinyl acetate may then be cross-linked with cross-linking agents conventionally used to cross-link polyvinyl alcohol, such as glutaraldehyde, glyoxal, formaldehyde, glycidyl acrylate or divinyl sulfone.

In other embodiments, the solid inorganic salt is dispersed in a mixture comprising the vinyl monomer containing a heteroatom and a cross-linking agent. The cross-linking agent in such embodiments comprises at least two co-polymerisable vinyl functionalities. The cross-linked vinyl polymer is then produced by co-polymerising the vinyl monomer and the cross-linking agent in the presence of the solid inorganic salt.

In order to achieve a suitable degree of cross-linking density in the vinyl polymer, the mixture may comprise from 0.2 to 3.5 mol % of the cross-linking agent (of the total monomer content), such as from 0.2 to 2 mol % of the cross-linking agent.

The mixture may comprise a photoinitiator such as 2,2-dimethoxy-2-phenylacetophenone. The vinyl monomer and the cross-linking agent may then be co-polymerised by irradiating the mixture with UV light for a time sufficient to initiate and satisfactorily complete the polymerisation. Alternatively, the mixture may comprise a thermally-activated initiator such as 2,2'-azobis(2-methylpropionitrile). The vinyl monomer and the cross-linking agent may then be co-polymerised by heating the mixture to a temperature and for a time sufficient to initiate and satisfactorily complete the polymerisation.

The reference element may be embedded in the electrochemically active composite by inserting the reference element into the mixture before completion of polymerisation, or by inserting the reference element into the polymer/KCl composition before completion of cross-linking. In general, the reference element should be inserted before the electrochemically active composite is hardened. In some embodiments, the reference element is inserted into the mixture before initiating polymerisation or cross-linking.

In some embodiments, the cross-linking agent is selected from the group consisting of the cross-linking agent is selected from the group consisting of ethylene glycol di(meth)acrylate, polyethylene glycol) di(meth)acrylate, and glycerol propoxylate triacrylate. In some embodiments, the vinyl monomer containing a heteroatom is selected from the group consisting of vinyl esters, vinyl amides and acrylates.

The method of the invention may further comprise containing the mixture within a casing while polymerising the vinyl monomer and the hydrophilic cross-linking agent. The casing thus shapes the body of the solid state reference electrode. The casing may be a container made of a suitably insulating and durable material for the envisaged electrode application, for example poly(methyl methacrylate). Where polymerisation is mediated by UV-irradiation, it may be preferred that the casing is transparent. After the polymerisation is complete, such that the electrochemically active composite is formed, a window of a suitable size may be created in the casing to partially expose a surface of the electrochemically active composite for direct contact with an analyte.

System and Method for Determining an Ionic Concentration in an Analyte

The present invention also relates to a system for determining an ionic concentration in an acidic and/or abrasive analyte. The system comprises a solid state reference electrode as described herein; an ion-selective electrode; and means for measuring the difference in electric potential between the ion-selective electrode and the reference electrode, such as a voltmeter or potentiostat. The invention also relates to a method of determining an ionic concentration in an acidic and/or abrasive analyte. The method comprises immersing an ion-selective electrode and a solid state reference electrode as described herein in an analyte; and measuring the difference in electrochemical potential between the ion-selective electrode and the reference electrode.

Ion-Selective Electrode

The ion-selective electrode may be any sensing electrode suitable for use in an acidic and/or abrasive analyte, for example in minerals processing or acid mine draining applications. The ion-selective electrode may be a glass electrode. Alternatively, the ion-selective electrode may be a polymeric composite electrode. In some embodiments, the ion-selective electrode is a composite sensor comprising a metal oxide dispersed in a polymeric matrix, for example as described in WO2016/033632.

In some embodiments, the ion-selective electrode is sensitive to hydrogen-ions, such that the system is a pH meter. The ion-selective electrode may be a composite hydrogen-ion selective sensor comprising a mixture of $Ta_2O_5$ and $RuO_2$ dispersed in a polymeric matrix, as described in WO2016/033632. In some embodiments, the ion-selective electrode is an electrode for oxidation/reduction potential (ORP) measurements, for example Pt based electrodes.

The system of the invention may comprise two or more ion-selective electrodes, the potential of each of which is measured against the solid state reference electrode.

The electrochemically active composite may optionally define a casing for the ion-selective electrode, which may be substantially embedded in, but electrically insulated from, the electrochemically active composite.

Analyte

The solid state reference may be suitable for use in electroanalytical measurements of a wide variety of analytes produced in the food industry, minerals processing, bioprocessing and environment monitoring. As described herein, an advantage of the solid state reference electrode of the invention may be enhanced resistance to corrosive acidic or mechanically abrasive environments. In some embodiments, the analyte therefore has a pH of below 4, or below 2, or below 1. In some embodiments, the analyte is a process stream from a minerals processing operation, such as heap leaching, including leachate and leach slurries, or an acid mine drainage stream.

Use of a Solid State Reference Electrode

The present invention also relates to use of a solid state reference electrode as described herein in an electrochemical analysis of an acidic analyte.

The electrochemical analysis may be a potentiometric or a voltametric electroanalytical measurement, preferably a potentiometric measurement. Potentiometric measurements may include ion-sensing measurements for a wide range of analytes, including hydrogen-ion (pH), metal ions such a cupric, calcium and sodium cations, and anions such as chloride and cyanide. Voltametric measurements may include cyclic voltammetry, square wave voltammetry and differential pulse voltammetry.

The acidic analyte may be a process stream from a mineral leaching process or an acid mine drainage stream. In some embodiments, the acidic analyte is a leachate or leach slurry from a mineral leaching process, such as heap leaching of an ore. In some embodiments, the analyte has a pH of below 4, preferably below 2, such as below 1. In some embodiments, the acidic analyte comprises sulfuric acid or hydrochloric acid, preferably sulfuric acid.

Other envisaged uses for the solid state reference electrode of the invention are in environment monitoring and protection systems and electrochemical synthesis of various products.

EXAMPLES

The present invention is described with reference to the following examples. It is to be understood that the examples are illustrative of and not limiting to the invention described herein.

Materials

All starting materials were purchased from Sigma Aldrich or other commercial suppliers. The KCl used was analytical quality (VWR AnalaR), to avoid shifts of the reference potential due to any inorganic contaminants. Monomers, cross-linking agents and initiators used were 98% purity or higher.

Example 1. Preparation of Electrodes with Cross-Linked Poly(Vinyl Acetate) (PVAc) Matrix Silver wires (1.5 mm thick, 99.95% Ag) were polished with fine sandpaper and washed with milliQ water. Each wire was inserted into into a 1 M KCl solution and connected to a potentiostat. The wires were coated with silver chloride coating by passing a small current (1-10 mA) between the silver electrode (anode) and a platinum counter electrode (cathode).

Mixtures of vinyl acetate and cross-linking agents including ethylene glycol dimethacrylate (EGDMA); polyethylene glycol diacrylate (PEGDA; average $M_n$=575; i.e. an average of c.a. 10 ethylene glycol units per molecule) and glycerol propoxylate triacrylate (GPTA; average Mn=428; i.e. an average of c.a. 3 propylene glycol units per molecule) were prepared as shown in Table 1. A small amount of 2,2-dimethoxy-2-phenylacetophenone (≤2 mass %) was added to each mixture as a photoinitiator.

TABLE 1

| Electrode number | Monomer | Cross-linking agent (CLA) | CLA Mass % of total monomer | CLA Mol % of total monomer |
|---|---|---|---|---|
| E1 | Vinyl acetate | None | 0 | 0 |
| E2 | Vinyl acetate | EGDMA | 0.5 | 0.22 |
| E3 | Vinyl acetate | EGDMA | 2 | 0.88 |
| E4 | Vinyl acetate | EGDMA | 3 | 1.33 |
| E5 | Vinyl acetate | EGDMA | 4 | 1.78 |
| E6 | Vinyl acetate | PEGDA | 1.5 | 0.23 |
| E7 | Vinyl acetate | PEGDA | 3 | 0.46 |
| E8 | Vinyl acetate | PEGDA | 5 | 0.78 |
| E9 | Vinyl acetate | GPTA | 1.5 | 0.31 |
| E10 | Vinyl acetate | GPTA | 3 | 0.62 |
| E11 | Vinyl acetate | GPTA | 5 | 1.04 |

Dried KCl powder was added to each mixture, and the settled slurries were transferred by pipette into glass vials (1-10 mL volume) such that the vials were lull of KCl powder with the monomer mixture filling the interparticle voids. A small amount (0.1-0.5 mL) of additional monomer mixture was transferred into the vial to form a salt-free sealing layer at the top of the vial during the subsequent polymerisation. The mass ratio of KCl to monomer was approximately 2:1 (67 mass KCl).

A silver chloride coated silver wire (2-5 cm length, depending on the vial size) was then inserted into each vial and the vials were sealed. The monomers were co-polymerised by irradiating the mixture with UV light (mercury vapour lamp). After completion of polymerisation (30 minutes to 3 hours), the bottom portions of the vials were removed by grinding to expose the solid composites comprising a matrix of polyvinyl acetate (PVAc) loaded with solid KCl. The electrodes were placed in an oven at 60° C. for 2 days to remove any unreacted monomer, and were then ready for use.

Example 2. Evaluation of Chemical Resistance

Electrodes E1-E5 prepared according to Example 1 (1.5 mL vial volume) were immersed in a strong acidic medium (10% $H_2SO_4$) at 85° C. This accelerated degradation test provides an indication of relative long term chemical stability under acidic heap leach conditions. By visual observation of the colour of the electrode material and the acidic medium, the cross-linked PVAc electrodes E2-E5 were found to be more resistant to acid attack than the uncross-linked PVAc electrode E1. The cross-linked electrodes also substantially retained their structural integrity (i.e. dimensional stability). The greatest stability was found with electrodes comprising PVAc with 2 and 3% by mass of EGDMA (E3 and E4). For these electrodes, the acidic test medium remained substantially uncoloured after 24 hours exposure to the acidic conditions. By contrast, the uncross-linked PVAc electrode E1 and the acidic medium in which it was immersed were both darkly coloured after 24 hours. Visual inspection revealed that the uncross-linked PVAc electrode E1 was substantially degraded by the acidic exposure, with the composite being transformed to a soft, gel-like state.

Figure 1:
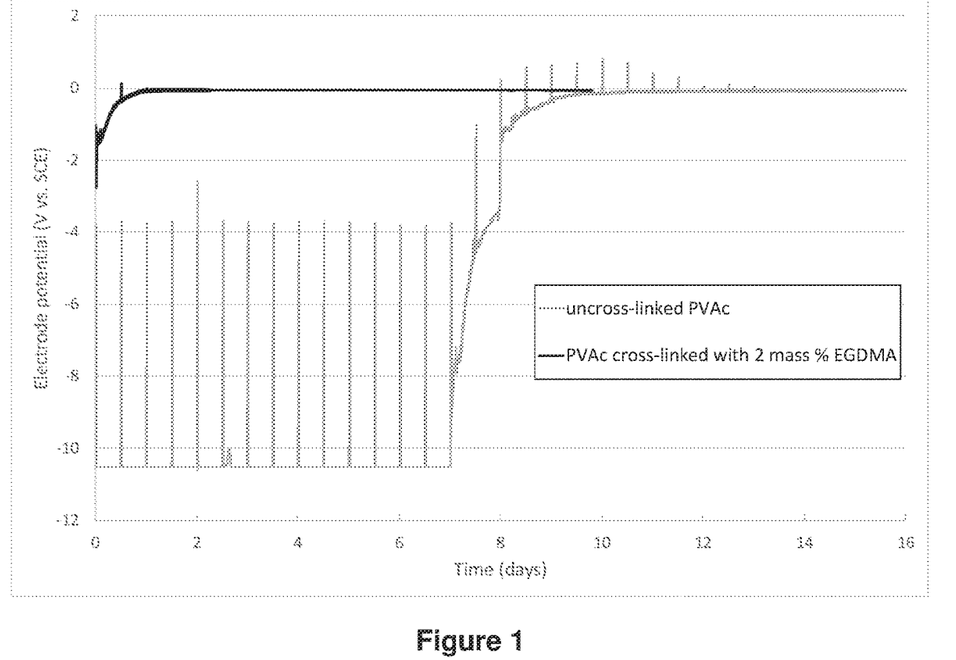
FIG. 1 is a graph depicting the potential response of reference electrodes comprising a polymer matrix of uncross-linked PVAc and PVAc cross-linked with 2% by mass of EGDMA, for the first 16 days after immersing the electrodes in 10% $H_2SO_4$ (Example 3a).

Example 3a. Conditioning of EGDMA Cross-Linked PVAc Electrodes in Acidic Analyte The electrochemical performance of electrodes E1 and E3, prepared according to Example 1 (1.5 mL vial volume) and containing 0% and 2% EGOMA by mass of monomer respectively, was evaluated in 10% $H_2SO_4$ at room temperature. The potential response of the electrodes were measured against a saturated calomel electrode (SCE) obtained from Koslow Scientific Company (which was regularly maintained during all electrochemical tests to ensure stable performance). A multi-channel potentiostat (Biologic VMP3 potentiostat) was used to record the open circuit potential (OCP) and electrochemical impedance spectroscopy signals of the electrodes in all electrochemical tests. FIG. 1 depicts the potential response for the two PVAc reference electrodes. The uncross-linked PVAc electrode E1 took approximately 12 days to fully stabilise. The spikes in the potential signal in FIG. 1 correspond to electrochemical impedance spectroscopy measurements which were performed every 12 hours, and demonstrate the very high impedance of the uncross-linked electrode during the stabilisation period. By contrast, the electrode E3 comprising PVAc with 2% EGDMA stabilised extremely rapidly, with stable potential and low impedance achieved after approximately 1 day.

Figure 2:
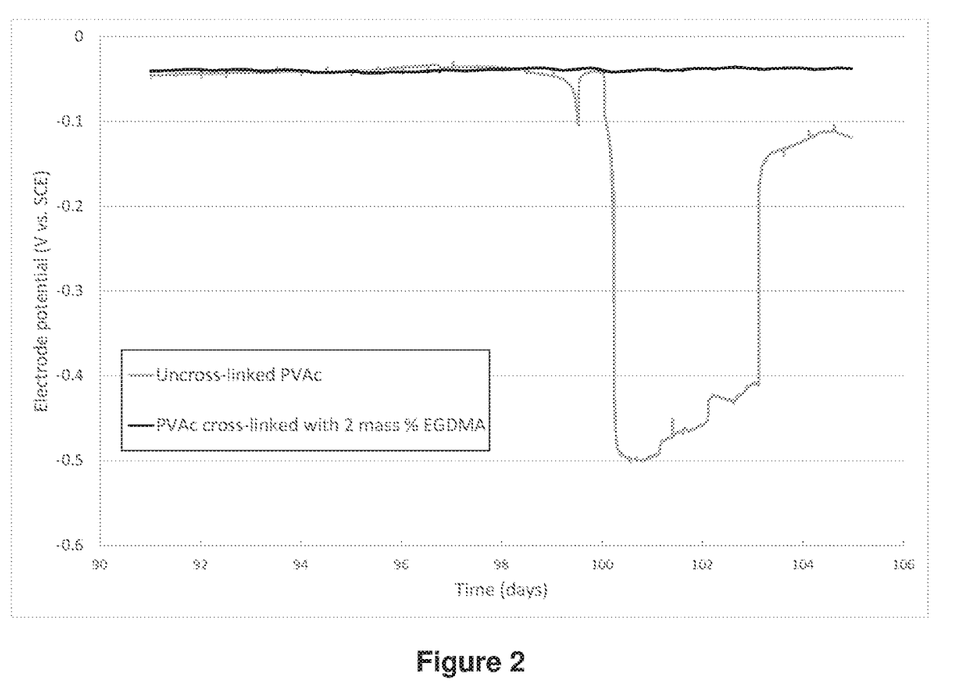
FIG. 2 is a graph depicting the potential response of reference electrodes comprising a polymer matrix of uncross-linked PVAc and PVAc cross-linked with 2% by mass of EGDMA, over the last 16 days of 105 days immersion in 10% $H_2SO_4$ (Example 3b).

Example 3b. Long Term Stability of EGDMA Cross-Linked PVAc Electrodes in Acidic Analyte The long term performance of the electrodes E1 and E3, comprising 0% and 2% EGDMA cross-linked PVAc respectively, in an acidic analyte was evaluated by continuing the experiment of Example 3a for a total of 105 days (i.e. continuous immersion in 10% $H_2SO_4$). FIG. 2 depicts the potential response for the two reference electrodes over the final 14 days of the experiment. The uncross-linked PVAc electrode E1 failed catastrophically after 100 days on line, whereas the 2% cross-linked PVAc electrode E3 continued to demonstrate excellent potential stability until the end of the experiment. Inspection of the electrodes after the experiment revealed that the uncross-linked PVAc electrode E1 had undergone significant degradation resulting in a loss of structural integrity (dark coloured, gel-like state). By contrast, the 2% EGOMA cross-linked PVAc electrode E3 substantially retained its initial form and mechanical properties despite the extended exposure to harsh acidic conditions.

Figure 3:
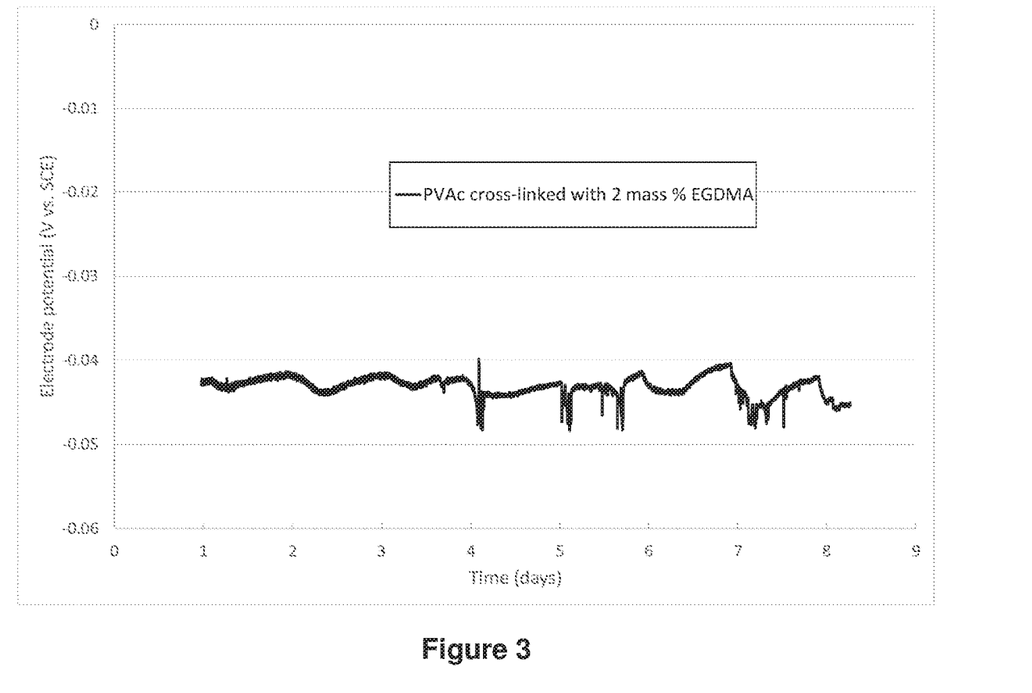
FIG. 3 is a graph depicting the potential response of a reference electrode comprising a polymer matrix of PVAc cross-linked with 2% by mass of EGDMA, immersed in 0.1 M $K_2SO_4$ (Example 4).

Example 4. Performance of EGDMA Cross-Linked PVAc Electrodes in Sulfate Salt Analyte The electrochemical performance of an electrode E3, prepared according to Example 1 (1.5 mL vial volume) and containing 2% EGDMA by mass of monomer, was evaluated in 0.1 M $K_2SO_4$ at room temperature. The potential response of the electrode was measured against the commercially procured SCE, as depicted in FIG. 3. Excellent potential stability was observed over the 8 day experiment, with only minor fluctuations (<5 mV; substantially attributable to variation of room temperature) being apparent.

Figure 4:
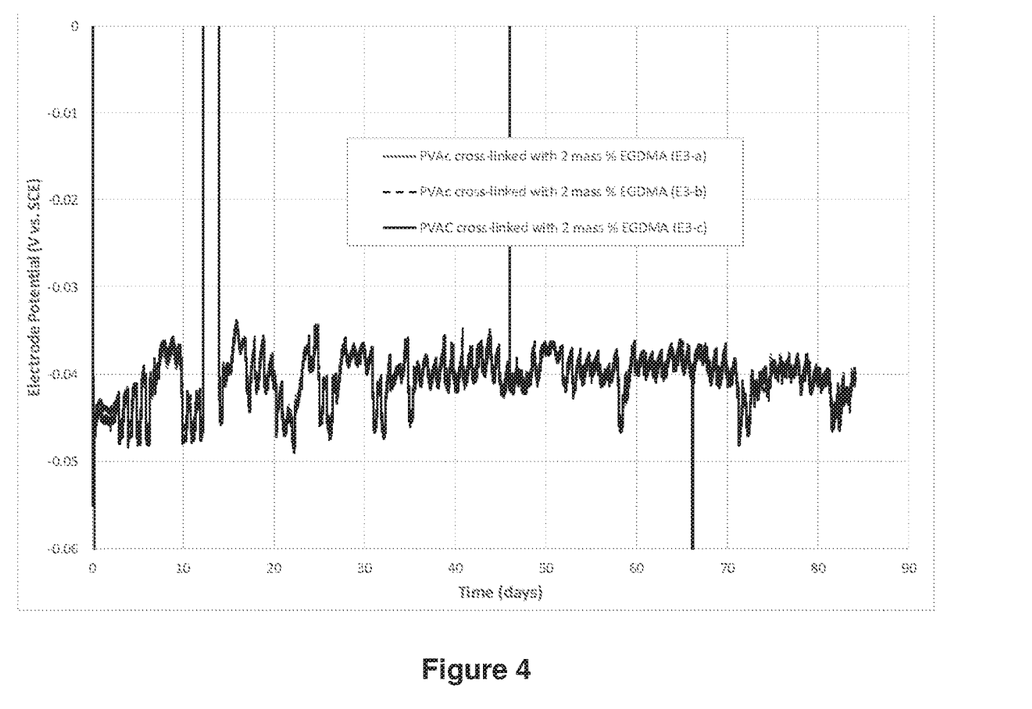
FIG. 4 is a graph depicting the potential response of three identical reference electrodes comprising a polymer matrix of PVAc cross-linked with 2% by mass of EGDMA, immersed in 1 M $Na_2SO_4$ (Example 4).

The electrochemical performance of electrodes E3 (3 identical electrodes E3-a, E3-b and E3-c measured to determine reproducibility) was also evaluated in 1 M $Na_2SO_4$ at room temperature, with the potential response again measured against the commercially procured SCE. In this case, the potential was measured over 84 days, as depicted in FIG. 4. Excellent potential stability and reproducibility between electrodes was observed over the experiment, with the minor fluctuations being attributable to variation of room temperature.

Figure 5:
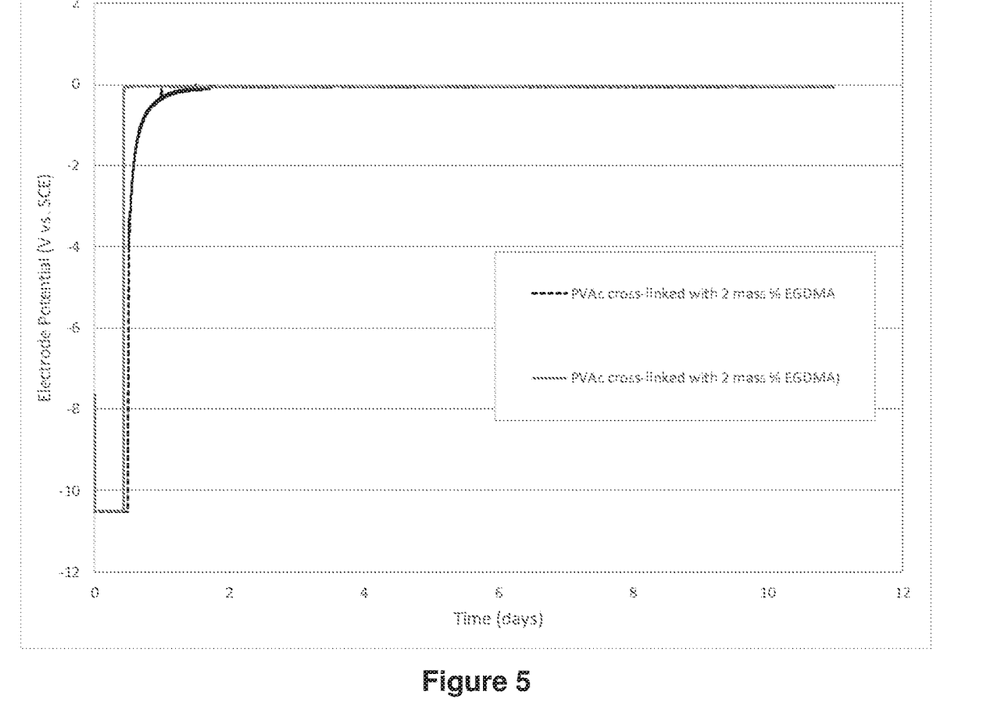
FIG. 5 is a graph depicting the potential response of two identical reference electrodes comprising a polymer matrix of PVAc cross-linked with 2% by mass of EGDMA, immersed in a heap leaching solution with pH 0.27 and dissolved metal content (Example 5).

Example 5. Performance of EGDMA Cross-Linked PVAc Electrodes in Acidic Heap Leaching Solution The potential response of two identical electrodes E3, prepared according to Example 1 (1.5 mL vial volume) and containing 2% EGDMA by mass of monomer, were measured against the commercially procured SCE at room temperature in an acidic analyte, as depicted in FIG. 5. The analyte, having the composition shown in Table 2, was a solution obtained by heap leaching of a copper-containing ore with acid. Both electrodes stabilised to within 0.07 V of the SCE within 2 days, and remained within this range for the duration of the 11 day experiment. This experiment demonstrates the ability of the electrodes of the invention to provide a stable reference potential even in severely corrosive acidic analytes containing high metal concentrations.

TABLE 2

| pH | Cu (g/litre) | Fe (g/litre) | S (g/litre) | P (mg/litre) | Cl (g/litre) |
| --- | --- | --- | --- | --- | --- |
| 0.27 | 0.60 | 3.17 | 32.7 | 1.4 | <0.003 |

Figure 6:
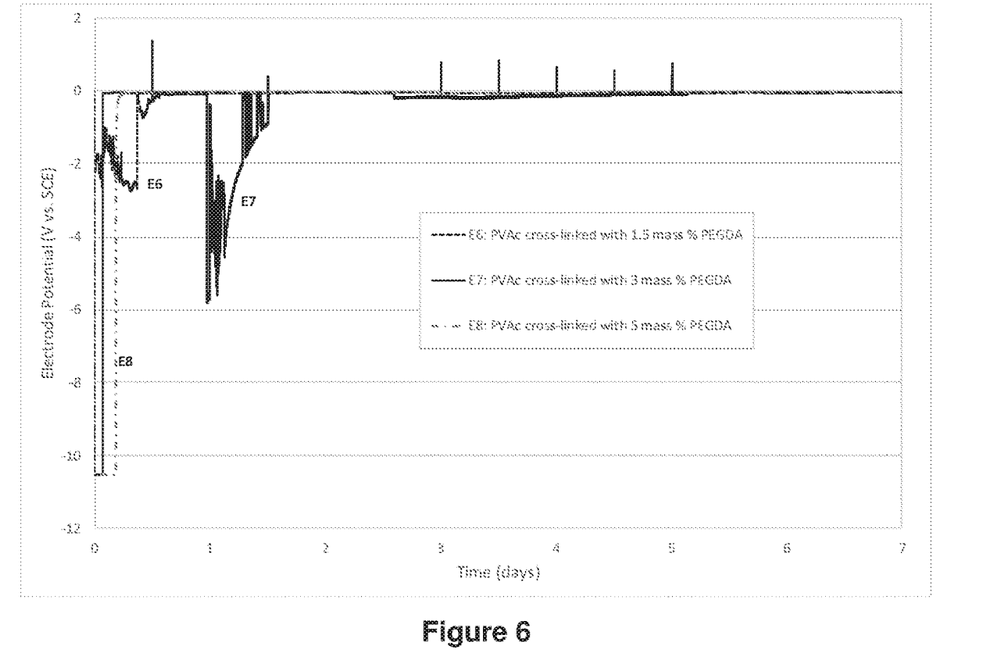
FIG. 6 is a graph depicting the potential response over an initial 7 day period of reference electrodes comprising a polymer matrix of PVAc cross-linked with 1.5, 3 or 5% by mass of PEGDA, immersed in 1 M $Na_2SO_4$ (Example 6a).
Figure 7:
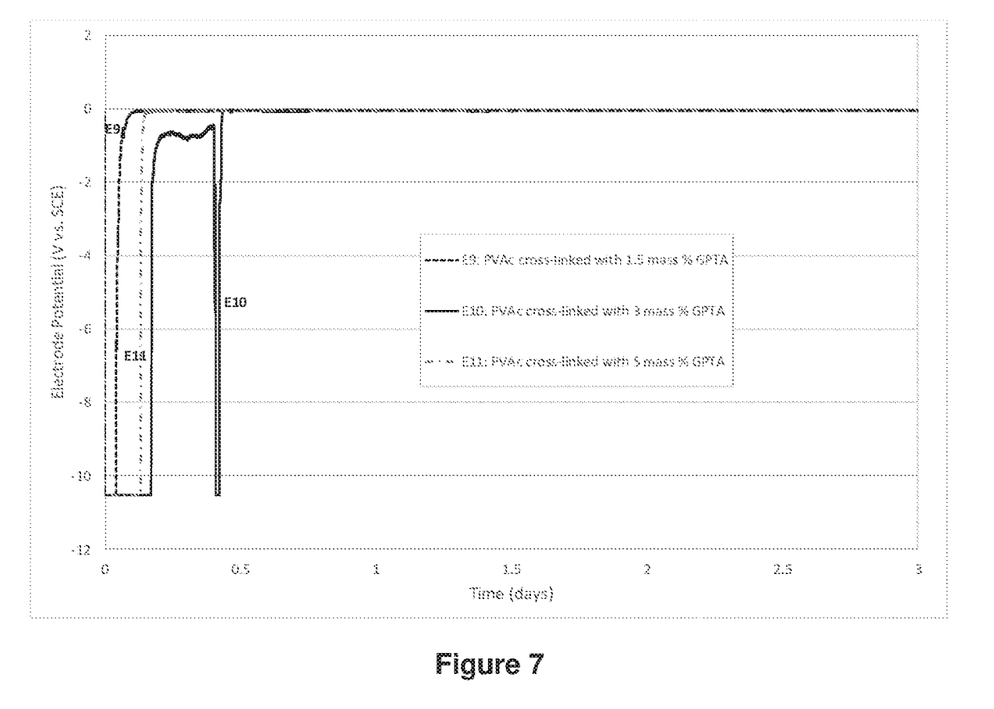
FIG. 7 is a graph depicting the potential response over an initial 3 day period of reference electrodes comprising a polymer matrix of PVAc cross-linked with 1.5, 3 or 5% by mass of GPTA, immersed in 1 M $Na_2SO_4$ (Example 6a).

Example 6a. Conditioning of PEGDA and GDTA Cross-Linked PVAc Electrodes in Sulfate Salt Analyte The electrochemical performance of electrodes E6-E11, prepared according to Example 1 (1.5 mL vial volume) and containing 1.5, 3 or 5% of PEGDA or GDTA by mass of monomer respectively, was evaluated in 1 M $Na_2SO_4$ at room temperature. The potential response of the electrodes was again measured against the commercially procured SCE. FIG. 6 depicts the potential response for electrodes E6-E8 (PEGDA cross-linked) and FIG. 7 depicts the potential response for electrodes E9-E11 (GDTA cross-linked). All electrodes were conditioned extremely rapidly, with stability and low impedance established within 2 days for the PEGDA-cross-linked composites (except for E7 which took 5 days to stabilise) and within 0.5 days for the GDTA-cross-linked composites.

Figure 8:
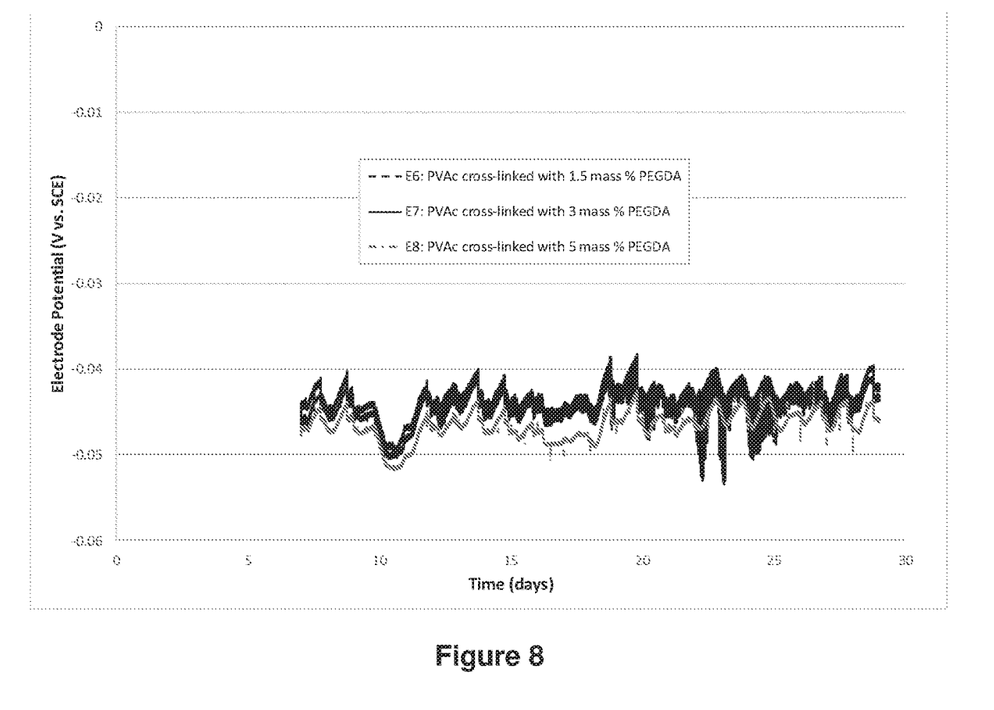
FIG. 8 is a graph depicting the potential response over a 29 day period of reference electrodes comprising a polymer matrix of PVAc cross-linked with 1.5, 3 or 5% by mass of PEGDA, immersed in 1 M $Na_2SO_4$ (Example 6b).
Figure 9:
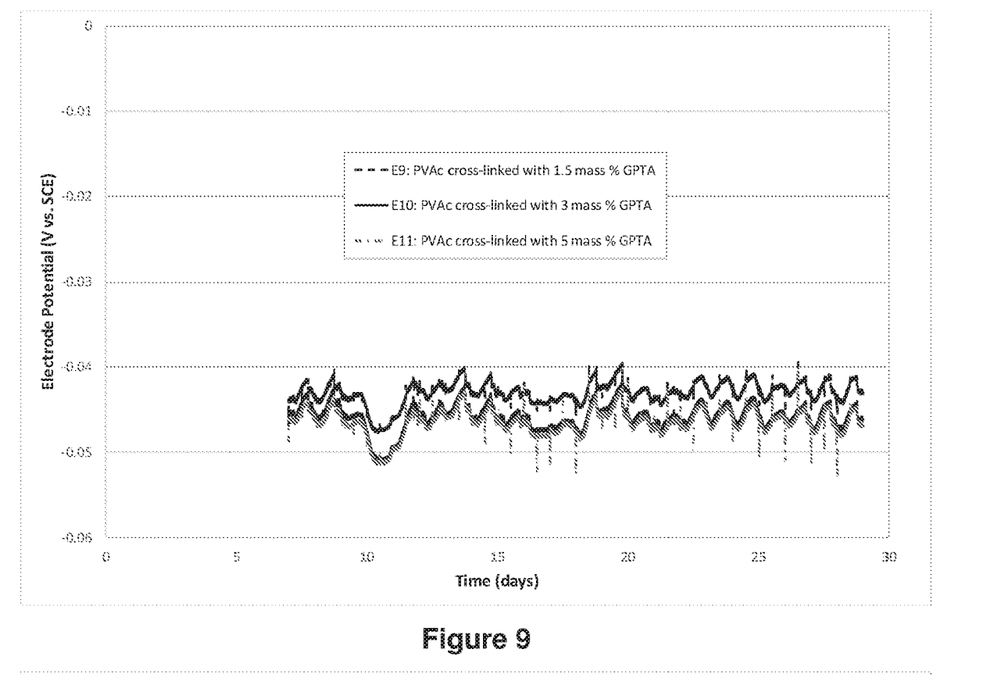
FIG. 9 is a graph depicting the potential response over a 29 day period of reference electrodes comprising a polymer matrix of PVAc cross-linked with 1.5, 3 or 5% by mass of GPTA, immersed in 1 M $Na_2SO_4$ (Example 6b).

Example 6b. Long Term Stability of PEGDA and GDTA Cross-Linked PVAc Electrodes in Sulfate Salt Analyte The long term performance of the electrodes E6-E11, containing 1.5, 3 or 5 of PEGDA or GDTA by mass of monomer respectively, in a sulphate salt analyte was evaluated by continuing the experiment of Example 6a for a total of 29 days (i.e. continuous immersion in 1 M $Na_2SO_4$). FIG. 8 depicts the potential response for electrodes E6-E8 (PEGDA cross-linked) and FIG. 9 depicts the potential response for electrodes E9-E11 (GDTA cross-linked) after the initial conditioning period. All electrodes demonstrated excellent potential stability and low impedance until the end of the experiment.

Example 7. Preparation of Electrodes with Cross-Linked Polyvinyl Caprolactam-Co-Vinyl Acetate) Matrix Electrodes were prepared following the method of example 1, except that the vinyl monomer comprised a mixture of vinyl caprolactam and vinyl acetate (9:1 w/w). The polymers of the composites were cross-linked with EGDMA or PEGDA (average $M_n$=575), using 2,2-dimethoxy-2-phenylacetophenone (≤2 mass %) as a photoinitiator, as shown in Table 3.

TABLE 3

| Electrode number | Monomer | Cross-linking agent (CLA) | CLA Mass % of total monomer | CLA Mol % of total monomer |
| --- | --- | --- | --- | --- |
| E12 | Vinyl caprolactam (90%) Vinyl acetate (10%) | EGDMA | 3 | 2.00 |
| E13 | Vinyl caprolactam (90%) Vinyl acetate (10%) | EGDMA | 5 | 3.36 |
| E14 | Vinyl caprolactam (90%) Vinyl acetate (10%) | PEGDA | 5 | 1.99 |

Figure 10:
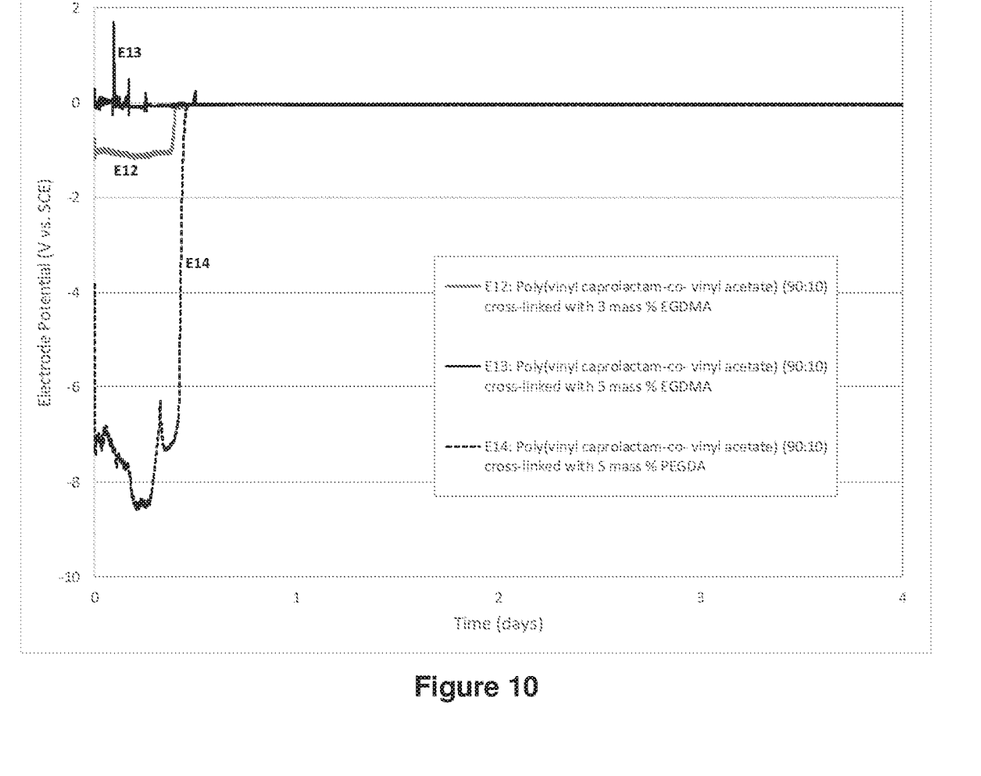
FIG. 10 is a graph depicting the potential response of reference electrodes comprising a polymer matrix of poly (vinyl caprolactam-co-vinyl acetate) cross-linked with 3 or 5% by mass of EGDMA or PEGDA, immersed in 1 M $Na_2SO_4$ (Example 8).

Example 8. Performance of Cross-Linked Polyvinyl Caprolactam-Co-Vinyl Acetate) Electrodes in Sulfate Salt Analyte The electrochemical performances of electrodes E12-E14, prepared according to Example 7 (1.5 mL vial volume), were evaluated in 1 M $Na_2SO_4$ at room temperature. The potential response of the electrodes was measured against the commercially procured SCE for 15 days, the first four depicted in FIG. 10. All of the electrodes stabilised extremely rapidly (<0.5 days), and continued to provide excellent potential stability until the end of the experiment.

Example 9. Preparation of Electrodes by Thermal Curing

Electrodes E15-E18 were prepared following the method of example 1, except that the monomer mixture contained 1 mass % 2,2'-azobis(2-methylpropionitrile) as a thermal initiator instead of 2,2-dimethoxy-2-phenylacetophenone (see Table 4). The polymer matrix of the composite was then thermally cured by placing the vials containing monomer mixture, KCl and embedded silver wire in a 50° C. oven for 19 hours.

The polymeric matrix of the thermally cured electrodes appeared whiter and mechanically tougher than the UV-cured electrodes, and the electrodes were free of smell indicating unreacted vinyl acetate.

TABLE 4

| Electrode number | Monomer | Cross-linking agent (CLA) | Curing | CLA Mass % of total monomer | CLA Mol % of total monomer |
|---|---|---|---|---|---|
| E15 | VAc | None | thermal | 0 | 0 |
| E16 | VAc | EGDMA | thermal | 1.5 | 0.66 |
| E17 | VAc | EGDMA | thermal | 2 | 0.88 |
| E18 | VAc | EGDMA | thermal | 4 | 1.78 |
| E1 | VAc | None | UV | 0 | 0 |
| E3 | VAc | EGDMA | UV | 2 | 0.88 |

Example 10. Evaluation of Chemical Resistance and Electrochemical Performance: Thermal Vs UV Curing of Electrodes Electrodes E15, E17 and E18 (prepared according to Example 9) and electrodes E1 and E3 (prepared according to Example 1) were immersed in 10% $H_2SO_4$ at 60° C. The thermal curing methodology resulted in more chemically resistant electrodes than UV curing, for both cross-linked and uncross-linked compositions, with less change in colouration and loss of mechanical integrity. Nevertheless, the surface of electrode E15 showed visible corrosion, which was not apparent for cross-linked electrodes E17 and E18.

The potential response of electrode E16, prepared according to Example 9 (1.5 mL vial volume), was measured against the commercially procured SCE in 1 M $Na_2SO_4$ at room temperature. The electrode stabilised to within 0.05 V of the SCE within 4 hours, and remained within this range for the duration of the 21 day experiment.

Example 11. Preparation of Electrodes with Crosslinking Agents of Reduced Hydrophilicity Electrodes E19-E22 were prepared following the method of Example 9, except that the monomer comprised a mixture of vinyl caprolactam and vinyl acetate (3:1 w/w), the cross-linking agents were either diurethane dimethacrylate or 1,6-hexanediol diacrylate (as shown in Table 5) and the electrodes were thermally cured in a 40° C. oven for 70 hours.

TABLE 5

| Electrode number | Monomer | Cross-linking agent (CLA) | CLA Mass % of total monomer | CLA Mol % of total monomer |
|---|---|---|---|---|
| E19 | Vinyl caprolactam (75%) Vinyl acetate (25%) | diurethane dimethacrylate | 3 | 0.79 |
| E20 | Vinyl caprolactam (75%) Vinyl acetate (25%) | diurethane dimethacrylate | 5 | 1.33 |
| E21 | Vinyl caprolactam (75%) Vinyl acetate (25%) | 1,6-hexanediol diacrylate | 3 | 1.62 |

TABLE 5-continued

| Electrode number | Monomer | Cross-linking agent (CLA) | CLA Mass % of total monomer | CLA Mol % of total monomer |
|---|---|---|---|---|
| E22 | Vinyl caprolactam (75%) Vinyl acetate (25%) | 1,6-hexanediol diacrylate | 5 | 2.73 |

Figure 11:
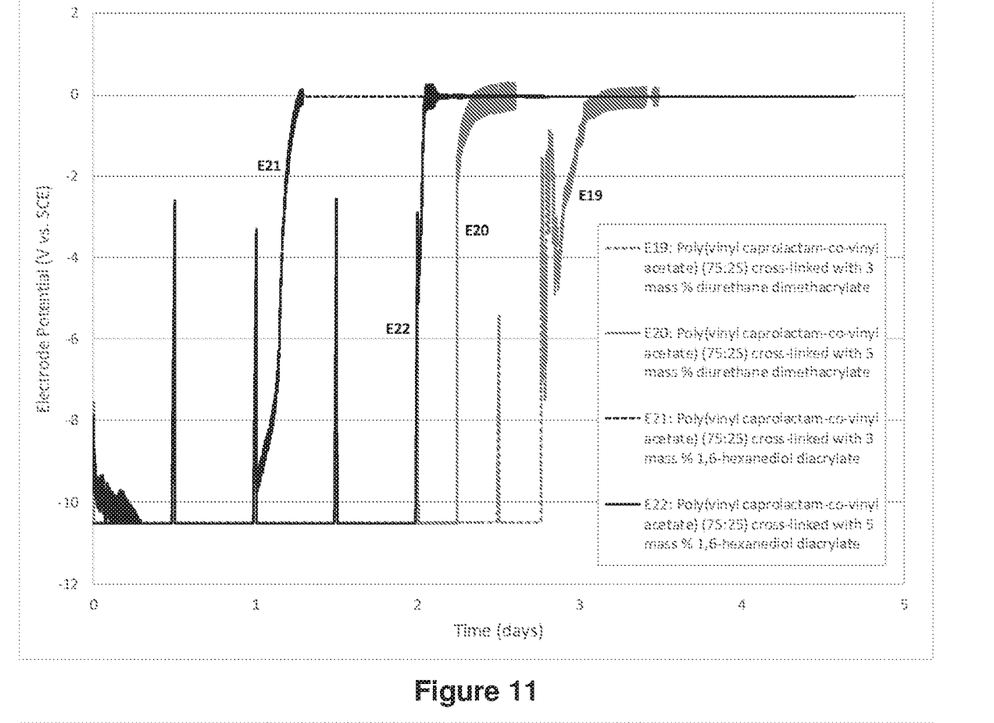
FIG. 11 is a graph depicting the potential response of reference electrodes comprising a polymer matrix of poly (vinyl caprolactam-co-vinyl acetate) cross-linked with 3 or 5% by mass of diurethane dimethacrylate or 1,6-hexanediol diacrylate, immersed in 1 M $Na_2SO_4$ (Example 12).

Example 12. Performance of Electrodes with Cross-Linking Agents of Reduced Hydrophilicity, in Sulfate Salt Analyte The potential response of electrodes E19-E22, prepared according to Example 11 (1.5 mL vial volume), were evaluated against the commercially procured SCE in 1 M $Na_2SO_4$ at room temperature, as depicted in FIG. 11. The conditioning of these electrodes, which have polymeric matrices cross-linked with the rather hydrophobic cross-linking agents diurethane dimethacrylate or 1,6-hexanediol diacrylate, took slightly longer (between one and four days) than for electrodes E12-E14, which have similar monomers but the more hydrophilic cross-linker agent EGDMA (less than 0.5 days).

It is believed that this is due to the reduced permeability of aqueous analyte into the electrode composite due to the lower hydrophilicity of the cross-linked polymeric matrix. Nevertheless, electrodes E19-E22 gave excellent stability once conditioned, demonstrating that polymeric matrices with an acceptable balance of hydrophilic and hydrophobic properties may be achieved using suitably polar vinyl monomers and hydrophobic cross-linking agents.

Example 13. Preparation and Evaluation of Comparative Resin Electrodes

Silver wires (1.5 mm thick, 99.95% Ag) were polished with fine sandpaper and washed with milliQ water. Each wire was inserted into into a 1 M KCl solution and connected to a potentiostat. The wires were coated with silver chloride coating by passing a small current (1-10 mA) through the silver electrode (anode) to a platinum counter electrode (cathode).

A resin was mixed with methyl ethyl ketone peroxide catalyst (2% by mass). Electrodes were prepared with both polyester resin and vinyl ester resin as the matrix. Dried KCl powder was mixed into the resin mixture (mass ratio of KCl to resin was approximately 2:1), and the mixture was then poured into glass vials (1.5 mL). A silver chloride coated silver wire (2 cm length) was then inserted into each vial and the vials were sealed. The electrode was left to cure overnight. The bottom portions of the vials were removed by grinding to expose the solid composites comprising a matrix of cured resin loaded with solid KCl. The electrodes were placed in an oven at 60° C. for 2 days, and were then ready for use.

Figure 12:
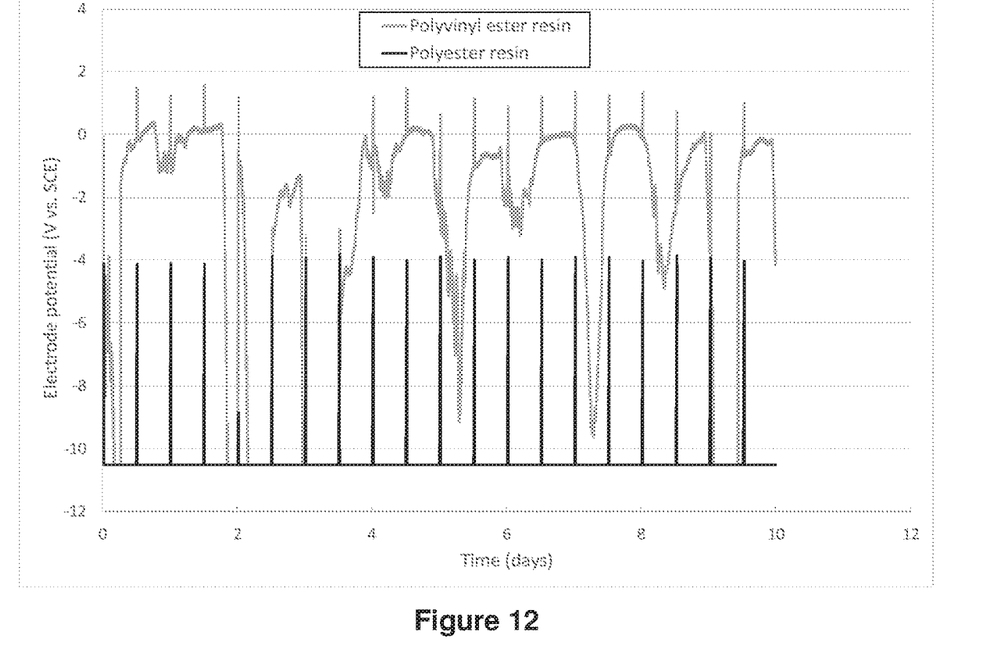
FIG. 12 is a graph depicting the potential response of reference electrodes comprising a resin matrix of polyester resin and vinyl ester resin, for 10 days after immersing the electrodes in 10% $H_2SO_4$ (Example 13).

The electrochemical performance of the two electrodes (i.e. polyester resin and vinyl ester resin) was then evaluated in 10% $H_2SO_4$ at room temperature. The potential response of the electrodes were measured against the commercially procured SCE. FIG. 12 depicts the potential response for the two resin reference electrodes. The electrodes failed to provide a stable potential and displaced very high impedance. It is believed that the resin matrix is insufficiently permeable to allow ionic conductivity between the reference element and the analyte.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A solid state reference electrode comprising:
a reference element embedded in an electrochemically active composite, the electrochemically active composite comprising a polymeric matrix loaded with a particulate solid inorganic salt, the solid inorganic salt being dispersed in the polymer matrix,
wherein the polymeric matrix comprises a cross-linked vinyl polymer of a vinyl monomer containing a heteroatom.

2. A solid state reference electrode according to claim 1, wherein the cross-linked vinyl polymer is cross-linked with hydrophilic cross-linking groups.

3. A solid state reference electrode according to claim 1, wherein the vinyl monomer containing a heteroatom is selected from the group consisting of vinyl esters, vinyl amides and acrylates.

4. A solid state reference electrode according to claim 1 wherein the vinyl monomer containing a heteroatom is selected from the group consisting of vinyl acetate, vinyl caprolactam, methyl (meth)acrylate, ethyl (meth)acrylate, butyl (meth)acrylate and hexyl (meth)acrylate.

5. A solid state reference electrode according to claim 1 wherein the electrochemically active composite comprises at least 30% by mass of the solid inorganic salt.

6. A solid state reference electrode claim 1 wherein the reference element is selected from the group consisting of an Ag/AgCl reference element, an Ag/Ag$_2$SO$_4$, reference element and a Cu reference element.

7. A solid state reference electrode according to claim 1, wherein the reference electrode is an Ag/AgCl reference element and wherein the solid inorganic salt is a chloride salt.

8. A solid state reference electrode according to claim 7, wherein the chloride salt is selected from the group consisting of potassium chloride, sodium chloride and lithium chloride.

9. A solid state reference electrode according to claim 1, wherein a surface of the electrochemically active composite is at least partially exposed for direct contact with an analyte.

10. A solid state reference electrode according claim 1 wherein the composite is dimensionally stable in an aqueous analyte.

11. A system for determining an ionic concentration in an acidic and/or abrasive analyte, the system comprising:
a solid state reference electrode according to claim 1:
an ion-selective electrode; and
means for measuring the difference in electric potential between the ion-selective electrode and the reference electrode.

12. A method of determining an ionic concentration in an acidic and/or abrasive analyte, the method comprising:
immersing an ion-selective electrode and a solid state reference electrode according to claim 1 in an acidic and/or abrasive analyte; and
measuring the difference in electrochemical potential between the ion-selective electrode and the reference electrode.

13. A method according to claim 12 wherein the analyte is a leachate or a leach slurry from a mineral leaching process or an acid mine drainage stream.

14. A method according to claim 12, wherein the analyte has a pH of below 4.

15. A solid state reference electrode according to claim 1, wherein the solid inorganic salt is a water-soluble salt.

16. A solid-state reference electrode according to claim 1 wherein the cross-linked vinyl polymer is a copolymer of the vinyl monomer and a cross-linking agent, wherein the cross-linking agent comprises at least two copolymerisable vinyl functionalities.

17. A solid state reference electrode, comprising:
a reference element embedded in an electrochemically active composite, the electrochemically active composite comprising a polymeric matrix loaded with a solid inorganic salt, the solid inorganic salt being dispersed in the polymer matrix,
wherein the polymeric matrix comprises a cross-linked vinyl polymer of a vinyl monomer containing a heteroatom
wherein the cross-linked vinyl polymer is a co-polymer of the vinyl monomer and a cross-linking agent, wherein the cross-linking agent comprises at least two co-polymerisable vinyl functionalities.

18. A solid state reference electrode according to claim 17, wherein the cross-linking agent is selected from the group consisting of ethylene glycol, dimethacrylate, diethylene glycol di(meth)acrylate, triethylene glycol di(meth)acrylate, tetraethylene glycol di(meth)acrylate, poly(ethylene glycol) di(meth)acrylate, N,N'-methylene bis-acrylamide, 1,3-butanediol di(meth)acrylate, 1,4-butanediol di(meth)acrylate, 1,6-hexanediol di(meth)acrylate, bisphenol A glycerolate di(meth)acrylate, diurethane di(meth)acrylate, divinylbenzene, trimethylolpropane tri(meth)acrylate, pentaerythritol tri(meth)acrylate, glycerol propoxylate triacrylate, trimethylolpropane ethoxylate triacrylate and trimethylolpropane propoxylate triacrylate.

19. A solid state reference electrode according to claim 17, wherein the cross-linking agent has the formula:

$CH_2=C(R^1)-C(=O)-(O-CH(R^2)-CH_2)_n\cdot O-C(=O)-C(R^1)=CH_2,$ or $X-[(O-CH(R^2)-CH_2)_n-O-C(=O)-C(R^1)=CH_2]m,$ wherein each $R^1$ and $R^2$ is independently selected from —H and —CH$_3$, wherein each n is an integer from 1 to 50, wherein m is an integer from 2 to 6, and wherein X is an organic radical linking group having a valency equal to the value of m.

20. A solid state reference electrode according to claim 17, wherein the vinyl polymer comprises from 0.2 to 3.5 mol % of the cross-linking agent.

* * * * *